United States Patent

Gelbart

[11] Patent Number: 5,081,617
[45] Date of Patent: Jan. 14, 1992

[54] OPTICAL SYSTEM FOR SIMULTANEOUS READING OF MULTIPLE DATA TRACKS

[75] Inventor: Daniel Gelbart, Burnaby, Canada
[73] Assignee: Creo Products Inc., Burnaby, Canada
[21] Appl. No.: 586,837
[22] Filed: Sep. 24, 1990
[51] Int. Cl.⁵ ............................................. G11B 7/00
[52] U.S. Cl. .................................... 369/112; 369/118
[58] Field of Search ..................... 369/112, 43, 44.11, 369/44.14, 44.23, 44.41, 44.42, 100, 110, 118, 121; 350/409, 235

[56] References Cited

U.S. PATENT DOCUMENTS

| | | | |
|---|---|---|---|
| 3,780,266 | 12/1973 | Mudsam et al. | 360/77.01 |
| 4,283,777 | 8/1981 | Curry et al. | 369/32 |
| 4,944,037 | 7/1990 | Ando | 369/100 |

Primary Examiner—Roy N. Envall, Jr.
Assistant Examiner—Thang V. Tran

[57] ABSTRACT

An optical system for reading and tracking multiple tracks of optically recorded data consists of a combination of spherical and cylindrical lenses shaping the emission of a laser diode into a narrow line on the surface of the recorded material. This line is subsequently imaged on a detector array containing multiple detectors for each data track being read. Digital signal processing identifies the tracks and follows them by selecting the proper detectors in the detector array. Track-to-track interference is minimized by selecting the numerical aperture of the final lens to have the nulls of the Airy pattern at double the track spacing.

3 Claims, 1 Drawing Sheet

OPTICAL SYSTEM FOR SIMULTANEOUS READING OF MULTIPLE DATA TRACKS

BACKGROUND OF THE INVENTION

The present invention relates to optical reading of multiple data tracks simultaneously. This is of particular interest in optical data storage and in optical inspection systems. Previous multi-track systems required breaking up the laser beam into multiple read beams and mechanically tracking the recorded data. A typical example for such a system is U.S. Pat. No. 4,283,777. Other systems used broad illumination of the read area and electronic tracking to read a single track such as U.S. Pat. No. 4,337,534. Using broad illumination increases cross-talk between tracks and give poor results when used with laser light due to laser speckle.

SUMMARY OF THE INVENTION

It is an object of the present invention to provide a readout system compatible with electronic tracking while maintaining the high signal-to-noise and low crosstalk of single spot tracking. A further object is to provide a wide tracking range and a large readout signal by using a laser as a light source without losing performance due to speckle caused by the coherence of the laser.

These objects, as well as others which will become apparent from the text which follows, are achieved by shaping the beam of a laser into a line and imaging that line onto the tracks being read, the line being perpendicular to the direction of the tracks. The line imaged onto the tracks is re-imaged onto a detector array followed by an electronic tracking circuit. An example of such a electronic tracking circuit can be found in U.S. Pat. No. 3,780,266 and will not be further detailed since it is well known in the art. The line imaged onto the tracks is scanned in the direction of the tracks by any of the well known laser beam scanning methods. These methods involve moving the material carrying the data tracks in the direction of the tracks or moving the image of the line on the stationary material. No further details of the scanning will be given since it does not form part of this invention.

The read signal can be maximized and the track-to-track cross talk minimized by selecting the optical parameters as follows: The width of the illuminating line in the direction of the tracks should be about the size of the smallest mark being read. The numerical aperture and the truncation function of the final lens in the system (i.e., the lens looking at the recorded tracks) should be selected that the nulls of the Airy pattern occur at double the track spacing. Under these conditions the track-to-track cross talk is minimized.

DETAILED DESCRIPTION OF THE PREFERRED EMBODIMENT

Figure 1:
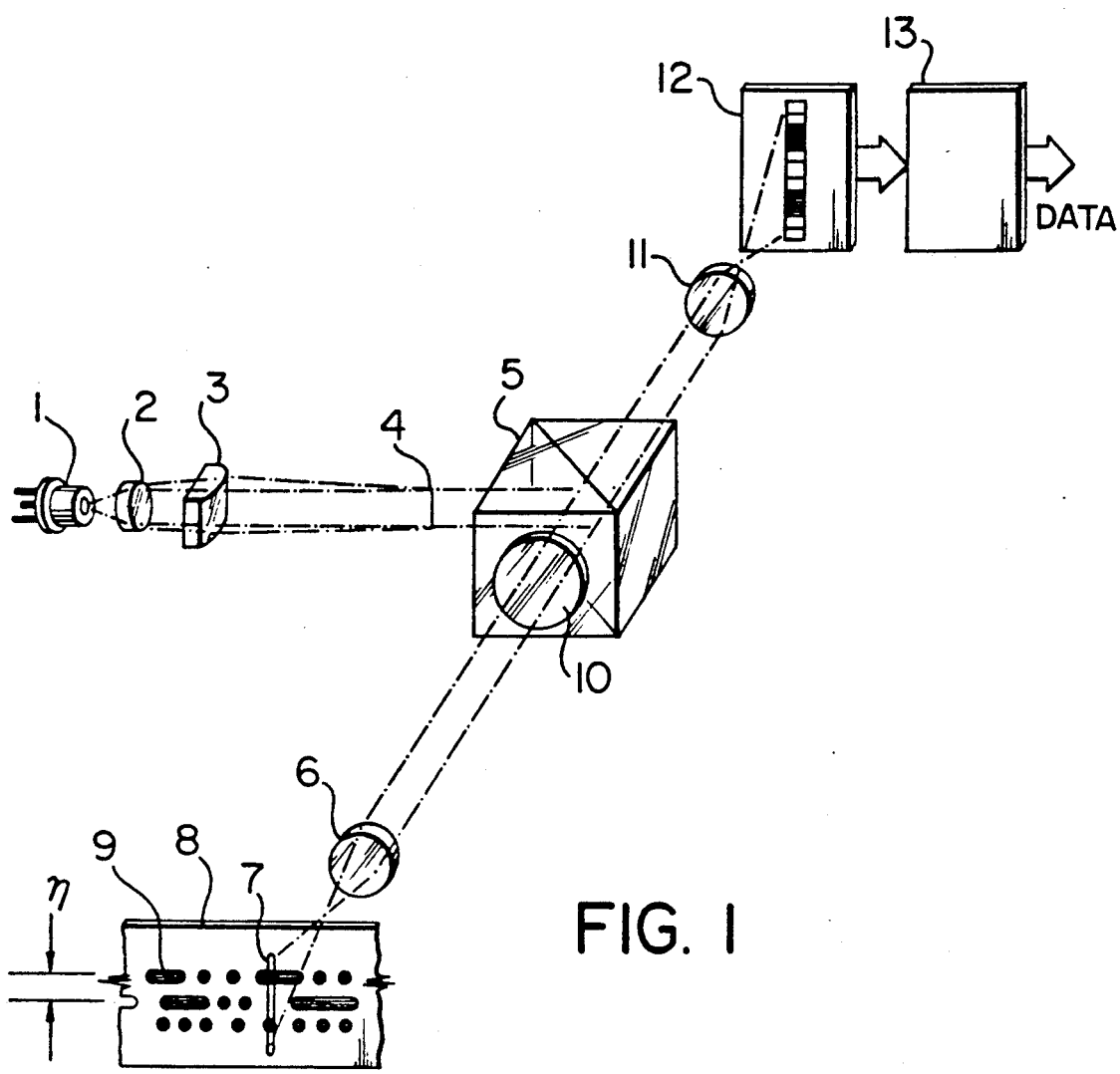
FIG. 1 is a schematic of the present invention.
Figure 2:
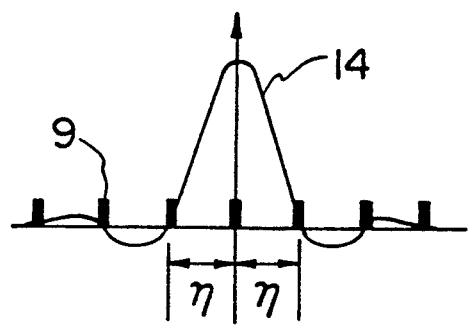
FIG. 2 is a schematic cross section of the Airy spot of the final lens relative to the tracks being read, showing the conditions for minimal cross-talk.

Referring to FIG. 1, the light emitted by laser diode 1 is collected by lens 2 and shaped by lens 3 into a narrow line 4. The orientation of laser diode 1 is such that the light is polarized parallel to line 4 and thus reflected by the hypotenuse of polarizing beam splitter 5. A quarter-wave plate 10 causes the light entering imaging lens 6 to be circularly polarized. Those versed in the art will recognize this arrangement as the well known optical isolator. Imaging lens 6 forms an image 7 of line 4 on the surface of recorded material 8 carrying a plurality of recorded tracks 9. The light reflected from line 7 is modulated by the data of tracks 9 and is re-imaged onto a detector array 12 using imaging lens 6 and a second imaging lens 11. Since the returned light from material 8 passes through waveplate 10 it will convert from circular polarization to linear polarization orthogonal to line 4 and will not be reflected by polarizing beam splitter 5. Diode array 12 has multiple detectors for each one of tracks 9 as well as extra detectors at ends to allow the image of tracks to wander on detector array without losing data. An electronic tracking unit 13 tracks the image and generates the output data. The operation of the electronic tracking is fully explained in U.S. Pat. No. 3,780,266 and no further data will be given here. The detector array 12 and electronic tracking 13 can be integrated into a single monolithic integrated circuit. In order to minimize track-to-track cross talk and maximize the readout signal the numerical aperture of lens 6 has to be chosen relative to the wavelength $\lambda$ of the laser diode 1 and the spacing of the tracks to be read, shown as "p" in FIG. 1 and 2. Referring now to FIG. 2, graph 14 shows a cross section of a single spot formed by lens 6 on material 8. The cross section is the well known Airy pattern and it is a function of three parameters: The wavelength $\lambda$, the numerical aperture of lens 6 (N.A.) and the truncation function of the light by the aperture of lens 6. Depending on the degree of truncation selected, the Airy pattern will have a null, also known as a dark ring, at a radius from $0.6 \, \lambda/N.A.$ to about $0.8 \, \lambda/N.A.$ When the track pitch "p" matches these nulls, the cross-talk between the tracks is minimized. This can be explained by viewing the line 7 as a summation of many points but only points which are a distance "p" apart, are sampled by the tracking circuit 13. For points a distance "p" apart along line 7, the Airy pattern of one point does not contribute to the sampling point of the Airy pattern of the next point, if the second point is located at a null of the first Airy pattern.

In order to scan material 8, any one of the well known scanning methods can be used along the track direction. If the spacing of the recorded marks along the track directions is also "p", same benefits of minimizing cross talk along the track (also known as inter-symbol interference) will occur. In general, the cross-talk between marks in the track direction can always be reduced by making the line narrower (using a higher N.A. for lens 6) but the cross-talk between tracks will only be minimized at a specific N.A. which satisfies $p = 0.6 \, \lambda/N.A.$ to $0.8 \, \lambda/N.A.$ By the way of example values will be given here for a system reading track on a 1.5 micron pitch at a wavelength of 0.83 microns. Since $"p" = 0.6 \, \lambda/N.A.$ to $0.8 \, \lambda/N.A.$, N.A. should be from 0.33 to 0.44. A lens 6 with N.A. = 0.4 would be a good choice. The selection of the other lenses is not critical. Lens 11 is chosen to match the image of the tracks to the detector pitch. By the way of example, laser diode 1 is model LT015MD made by Sharp (Japan), lens 2 and lens 6 are aspheric plastic lenses of f = 4.5 N.A. = 0.4, lens 3 is a cylindrical lens of f = 25 mm, optical isolator 5 is a readily available commercial component. Detector array 12 and tracking electronics 13 are a monolithic integrated circuit and four detectors are used for each track. If detector pitch is, by the way of example, 20 microns, lens 11 has to magnify image of tracks formed by lens 6 until the magnified track pitch as projected onto detector array 12 equals 80 microns. This is readily accomplished by selecting the correct focal length and spacing for lens 11.

What is claimed is:

1. An optical system for the simultaneous reading of a plurality of data tracks with minimal optical cross-talk between tracks comprising of a laser; at least one lens collecting light from said laser and shaping it into a line; an imaging lens imaging said line onto said data tracks, image of said line being perpendicular to said data tracks, said imaging lens minimizes the said optical cross-talk between said data tracks while capturing the light reflected back from said data tracks, said minimizing of cross-talk is achieved by choosing a numerical aperture for said imaging lens generating Airy pattern nulls at approximately double the spacing of said data tracks; and array of photo-detectors and means of projecting said reflected light onto said photo-detectors, the number of said photo-detectors being at least twice the number of data tracks being read in order not to require the light reflected from any of said data tracks to line up with any particular one of said photo-detectors.

2. An optical system for the simultaneous reading of a plurality of data tracks as recited in claim 1 wherein the numerical aperture of said imaging lens is selected to be between 60% to 100% of the wavelength of said laser divided by the center-to-center spacing of said data tracks in order to minimize the cross-talk between track while at the same time forming a diffraction limited line in the track direction.

3. An optical system for the simultaneous reading of a plurality of data tracks as recited in claim 1, wherein said laser is a diode laser, said line is formed by using a spherical lens followed by a cylindrical lens, and there are four of said photo-detectors detecting per data track being read.

* * * * *